April 6, 1926.                                                         1,579,477
C. P. FOLMAR
MINING MACHINE TRUCK
Filed Oct. 12, 1921
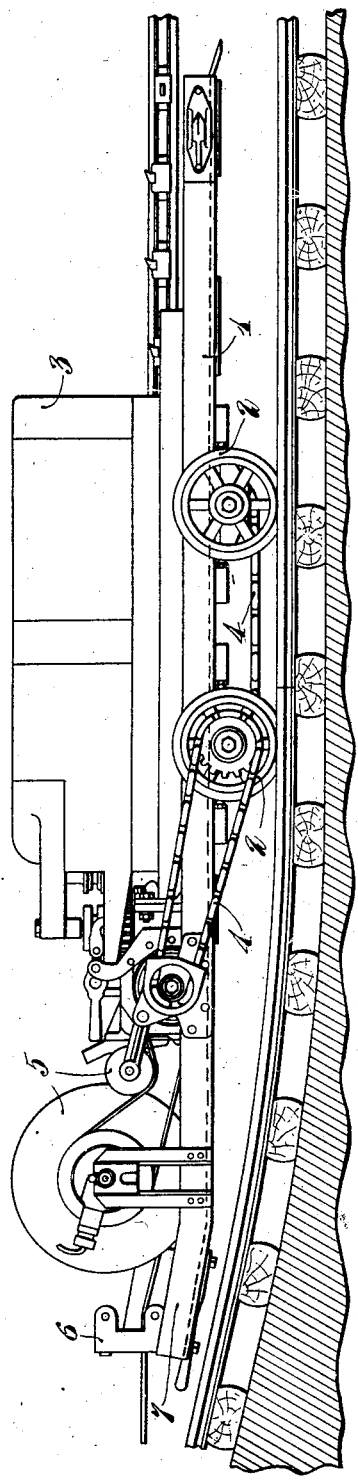
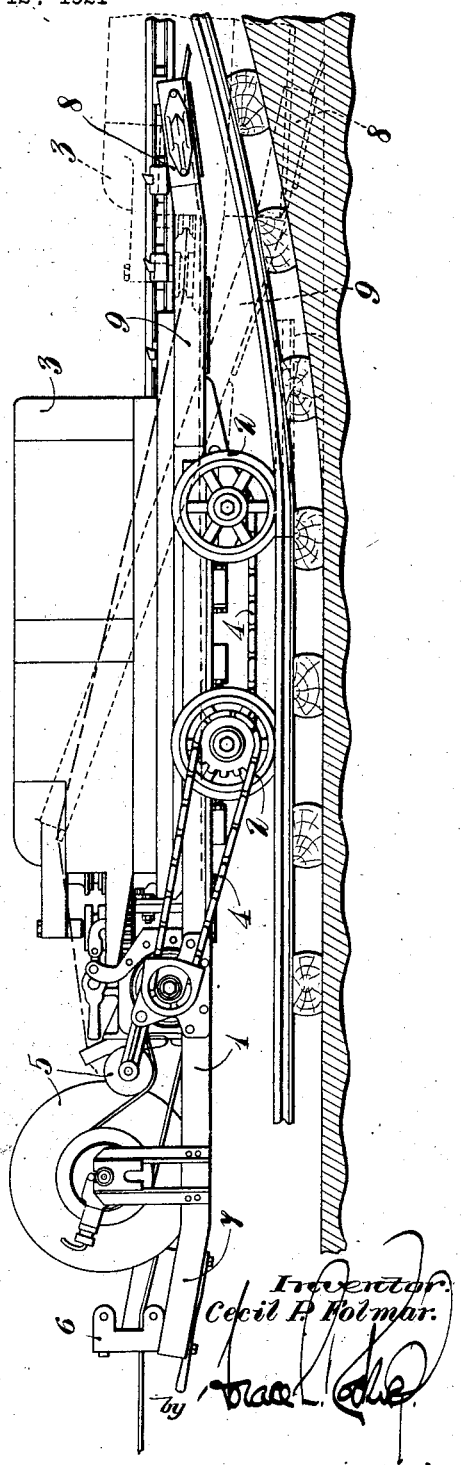
Inventor
Cecil P. Folmar.
by
Atty.

Patented Apr. 6, 1926.

1,579,477

UNITED STATES PATENT OFFICE.

CECIL PARKER FOLMAR, OF BIRMINGHAM, ALABAMA, ASSIGNOR TO SULLIVAN MACHINERY COMPANY, A CORPORATION OF MASSACHUSETTS.

MINING-MACHINE TRUCK.

Application filed October 12, 1921. Serial No. 507,335.

*To all whom it may concern:*

Be it known that I, CECIL PARKER FOLMAR, a citizen of the United States, residing at Birmingham, in the county of Jefferson and State of Alabama, have invented certain new and useful Improvements in Mining-Machine Trucks, of which the following is a full, clear, and exact specification.

My invention relates to mining machine trucks.

It has for its object to provide improved means whereby a mining machine truck may be adapted to use on pitches and more especially on sharply pitched trackways, without conflict between the end of the truck and the trackway and without disturbing the location of the truck wheels, my invention being more particularly adapted to long mining machine trucks of the type wherein it is desirable for purposes of traction to keep the wheels close together substantially beneath the center of gravity of the truck when the mining machine is thereon.

In the accompanying drawings I have shown for purposes of illustration two embodiments which my invention may assume in practice.

In these drawings:—

Fig. 1 is a side elevation of a mining machine truck equipped with one form of my improvement.

Fig. 2 is a side elevation of another truck equipped with a modified form of my improvement.

Referring first to the illustrative form of my invention shown in Fig. 1, it will be noted that I have there shown a mining machine truck 1 of a rigid upstanding type extending a substantial distance in rear of the truck wheels 2 which, as in a usual construction, are for traction purposes disposed close together beneath the center of gravity of the truck when a mining machine, herein a machine 3 of the flexibly fed type, is mounted for transport thereon. As in a usual construction, driving connections, herein in the form of mechanism driving chains 4, are also provided between the mining machine and the truck wheels, and a reel and driving mechanism 5 and a cable guide 6 are carried on the rear end of the truck.

In my improved construction, it will be noted that the rear end of the truck 1 is inclined, herein bent, upward as indicated at 7 in such a manner as, without decreasing the length of the truck and thereby causing congestion of the necessary truck reel driving mechanism 5 and cable guiding mechanism 6 and further without requiring wider spacing of the wheels 2, to enable the truck to move over a trackway pitching at relatively great inclinations, without conflict between the truck and the track, my improved construction enabling the truck to be moved down an incline and along the horizontal or up an incline from the horizontal without the conflict which because of the truck length would otherwise result in derailing the machine, damage to the machine or trackway, or injury to the runners riding on the truck. Attention is also directed to the fact that the cable reel 5 is carried on the rearwardly extending portion while the cable guide 6 is carried on the upwardly inclined end thereof, thereby making it possible for a large reel to be used without decreasing the clearance between the top of the reel and the mine roof.

In the form of my invention shown in Fig. 2, I have illustrated a truck 1 having a rear end of the same general construction but having an upwardly inclined front end 8 on a tiltable member 9 projecting a substantial distance in front of the truck frame. This construction is preferred as it permits free movement of the truck in either direction without conflict at either end of the truck and possesses a further advantage in that the tiltable member 9 is thus enabled to present an easier means of ingress for the mining machine when, as indicated in dotted lines, the member 8 is in loading position and the flexible feeding member of the latter is connected to abutments on the member 9 or truck, it being understood that, due to the upwardly inclined end, the front end of the tilting member, which rests upon the bottom when in loading position, is disposed at a less angle to the bottom in such a manner as to permit the mining machine to move more easily onto it during the first stages of its loading movement. Here it will be understood that the tilting member of the truck is held in rigid relation to the remainder of the truck when the mining machine has been moved up over the same, the tilting member being tilted by the machine into a horizontal position on the truck and held in that position during transport.

While I have in this application specifically described two embodiments which my invention may assume in practice, it will be understood that these forms of the same are shown for purposes of illustration and that the invention may be modified and embodied in various other forms without departing from its spirit or the scope of the appended claims.

What I claim as new and desire to secure by Letters Patent is:

1. A mining machine truck comprising a rigid wheeled truck frame having front and rear wheels disposed close together, a rearwardly extending frame portion extending a substantial distance in rear of said rear wheels and having an upwardly inclined rear end, and a forwardly extending tiltable portion pivoted on the front end of said rigid frame and having a portion extending upwardly when the parts are in a position corresponding to that which they occupy when the machine is being transported thereon, said upwardly extending portion providing a track upon which a mining machine may be run.

2. The combination with a mining machine truck, of a tiltable machine receiving and guiding member pivoted thereon on a transverse axis and having its front end movable into contact with the mine bottom and said front end upwardly inclined relative to the remainder of said member to form an inclined trackway in such manner as to reduce the angle of the loading surface on said end relative to the bottom.

3. A mining machine truck comprising, in combination, running gear, and a mining machine supporting portion which assumes during loading of a machine thereon a position inclined to the horizontal, said portion having top and bottom surfaces substantially parallel to each other and being upturned at its forward end whereby the top and bottom surfaces of said upturned portion make equal angles with the planes of the remaining portions of said surfaces.

4. A mining machine truck comprising, in combination, wheels, and a machine loading and supporting body supported on said wheels and having an upper surface comprising a portion normally supporting a mining machine during transport and, at opposite ends of said portion, portions whose upper surfaces are upwardly inclined, said several portions being so formed that their lower surfaces are in each case more nearly parallel to their upper surfaces than to the lower surfaces.

5. A mining machine truck comprising wheels, and a body supported thereon and adapted to support a machine thereon, said body having upturned ends and having an upper surface lower at its central portion than at its ends.

In testimony whereof I affix my signature.

CECIL PARKER FOLMAR.